(12) United States Patent  (10) Patent No.: US 9,244,736 B2
Huscroft et al.  (45) Date of Patent: Jan. 26, 2016

(54) THINNING OPERATING SYSTEMS

(71) Applicant: Hewlett-Packard Development Company, L.P., Houston, TX (US)

(72) Inventors: Carey B. Huscroft, Davis, CA (US); Benjamin D. Osecky, Fort Collins, CO (US); Aland B. Adams, Fort Collins, CO (US); Dale C. Morris, Steamboat Springs, CO (US); Stephen B. Lyle, Granite Bay, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 12 days.

(21) Appl. No.: 13/751,886

(22) Filed: Jan. 28, 2013

(65) Prior Publication Data

US 2014/0215468 A1  Jul. 31, 2014

(51) Int. Cl.
*G06F 3/00* (2006.01)
*G06F 9/44* (2006.01)
*G06F 9/46* (2006.01)
*G06F 13/00* (2006.01)
*G06F 9/50* (2006.01)
*G06F 9/445* (2006.01)

(52) U.S. Cl.
CPC .......... *G06F 9/5022* (2013.01); *G06F 9/44594* (2013.01)

(58) Field of Classification Search
None
See application file for complete search history.

(56) References Cited

U.S. PATENT DOCUMENTS

| 6,802,061 | B1* | 10/2004 | Parthasarathy et al. | 717/173 |
| 7,587,722 | B2* | 9/2009 | Bendapudi et al. | 719/319 |
| 8,230,095 | B2 | 7/2012 | Tsui et al. | |
| 8,495,355 | B2* | 7/2013 | Cross et al. | 713/100 |
| 2002/0065879 | A1 | 5/2002 | Ambrose et al. | |
| 2003/0074487 | A1* | 4/2003 | Akgul et al. | 709/328 |
| 2006/0200594 | A1* | 9/2006 | Cobb et al. | 710/18 |
| 2009/0210688 | A1* | 8/2009 | Kohiga | 713/1 |
| 2009/0271776 | A1* | 10/2009 | Schreier et al. | 717/170 |
| 2010/0306774 | A1 | 12/2010 | Kalbarga | |
| 2014/0007140 | A1* | 1/2014 | Hall et al. | 719/328 |

OTHER PUBLICATIONS

Unknown., "InstallAnywhere 2012 Evaluation Guide," Retrieved from http://www.flexerasoftware.com/webdocuments/PDF/IA2012-EvalGuide.pdf, Oct. 10, 2012, 90 pages.

Ta-Min, et al., "Splitting Interfaces: Making Trust Between Applications and Operating Systems Configurable," Proceedings of the 7th USENIX Symposium on Operating Systems Design and Implementation, Nov. 6-8, 2006, 20 pages.

* cited by examiner

*Primary Examiner* — Diem Cao
(74) *Attorney, Agent, or Firm* — Brooks, Cameron & Huebsch, PLLC

(57) ABSTRACT

Thinning operating systems can include monitoring a number of functionalities of an operating system, the number of functionalities of the operating system being provided by a number of computing components loaded thereon. Thinning operating systems can include automatically identifying an undesired functionality of the number of functionalities during runtime and removing from the operating system at least one of the number of computing components providing the undesired functionality as a result of the automatic identification to thin the OS.

19 Claims, 3 Drawing Sheets

THINNING OPERATING SYSTEMS

BACKGROUND

Business processes may be a factor in the operational success of an organization. The business processes may be implemented using applications, for example, applications running on an operating system. Therefore, the organization may have an interest in pursuing efficient (e.g., as intended) operation of the applications and/or the operating system.

DETAILED DESCRIPTION

Figure 1:
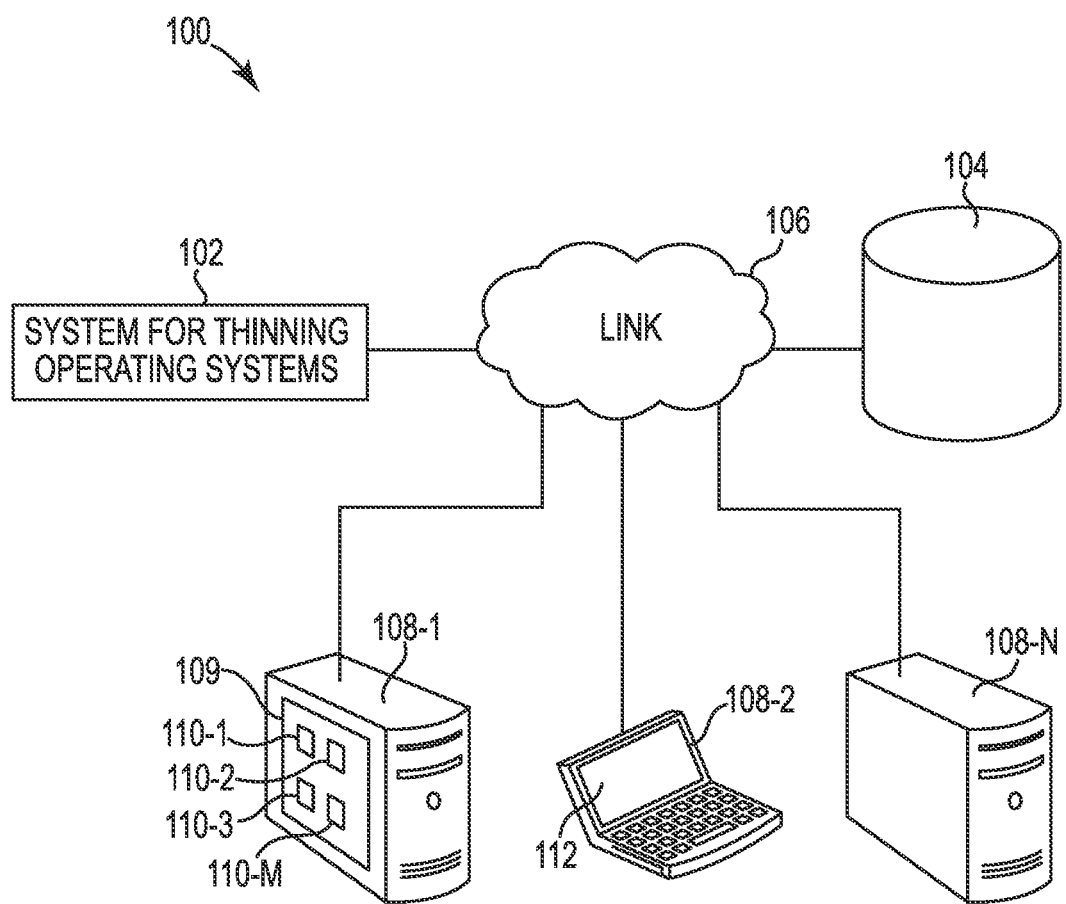
FIG. 1 illustrates a block diagram of an example of an environment in which various examples may be implemented according to the present disclosure.

With increasing pressure on organizations to improve performance, the organizations may seek to increase efficiencies associated with operating systems (OS)s, for instance, by adding functionalities to the OSs that employ such functionalities and/or removing functionalities that are not employed. That is, a number of functionalities can be provided by a number of computing components loaded thereon (e.g., loaded on an operating system of the number of operating systems). The number of functionalities can include, for example, web browsing, data analysis, and/or word processing, among other functionalities. The number of computing components can, for example, include software, such as, applications and/or applets, and/or can include firmware, among other types of computing components.

Thinning operating systems can refer to adding functionalities to an OS that employ such functionality and/or removing a functionality (e.g., removing an undesired function), as described herein. Such thinning can be used in conjunction with new and/or legacy applications. Additionally, such thinning can promote efficiencies of the number of functions (e.g., functions remaining) on the OS, for example, by avoiding context switching and/or providing comparatively less input/output (I/O) stalls compared to an OS that is not thinned, among other efficiencies. As described herein, context switching can refer to switching in a register context, a task context, a thread context, and/or a process context, among switching in other contexts.

Some previous techniques attempting to provide similar efficiencies may rely upon the use of mainframes, middleware, and/or hypervisors. However, such previous techniques have proven to be complex, difficult (e.g., time-consuming), inflexible (e.g., unable to deploy in a variety of contexts), and/or inefficient, among other short comings. For example, such approaches may rely upon the use of standard (e.g., identically configured) operating systems and/or manual tuning thereof.

In contrast, examples of the present disclosure include methods, systems, and computer-readable and executable instructions for thinning operating systems. As described herein, an example method can include monitoring a number of functionalities of an OS. That is, the number of computing components can provide the number of functionalities of the operating system. Additionally, the example method can, in various examples, include automatically indentifying an undesired functionality of the number of functionalities. As described herein, an undesired functionality refers to a functionality that is unused (e.g., provided by a computing component that is unused) by the operating system for a threshold amount of time. Accordingly, an undesired computing component can refer to a computing component providing an undesired functionality. For example, an undesired functionality may not be employed by a given OS and/or may be infrequently employed. Such infrequent employment refers to a functionality that remains unemployed (e.g., sits idle) in excess of a threshold amount of time for a given OS. The threshold amount of time can be determined (e.g., adjusted) by a user, for example, via a user device and/or can be based upon a service level agreement (SLA).

In various examples, the example method can include removing (e.g., automatically removing) from the OS at least one of the number of computing components providing the undesired functionality as a result of the automatic identification to thin the OS. Removing can include executing instructions stored in memory to completely remove and/or partially remove the computing component (e.g. removing all but the registry information of the computing component from the OS).

In the following detailed description of the present disclosure, reference is made to the accompanying drawings that form a part hereof, and in which is shown by way of illustration how examples of the present disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As will be appreciated, elements shown in the various examples herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features. In addition, "for example" and similar phrasing is intended to mean, "by way of example and not by way of limitation".

FIG. 1 illustrates a block diagram of an example of an environment in which various examples may be implemented according to the present disclosure. The environment 100 is shown to include a system for thinning operating OSs (e.g., system 102), user devices 108-1, 108-2, . . . 108-N, a storage device 104, and a link 106. The system for thinning OSs (e.g., the system 102), as described herein, represents a combination of hardware and programming for thinning OSs.

For example, as illustrated in FIG. 1, a number of computing components 110-1, 110-2, 110-3, . . . 110-M can be sent, for example, via the link 106, to and/or from user devices 108-1, 108-2, . . . 108-N coupled to the storage device 104 in order to promote thinning OSs. Such a storage device represents hardware and/or software suitable to store the number of computing components that is separate and distinct from local memory associated with the OS.

User devices 108-1, 108-2, . . . 108-N represent computing devices having a number of OSs (e.g., OS 109), browsers, and/or other applications stored thereon (e.g., in local memory) to promote thinning of OSs. In some examples, user devices 108-1, 108-2, . . . 108-N can include a graphical display (e.g., a graphical user interface 112).

The link 106 represents one or more of a cable, wireless, fiber optic, or remote connections via a telecommunication link, an infrared link, a radio frequency link, or other connectors or systems that provide electronic communication. The link 106 can include a link to, for example, an intranet, the Internet, or a combination of both, among other communication interfaces. The link 106 can also include intermediate proxies, for example, an intermediate proxy server (not shown), routers, switches, load balancers, among other components to promote thinning operating systems.

Accordingly, in some examples of the present disclosure, an OS configurator (not shown) can be provided, for example, by a non-transitory computer-readable medium (CRM) (e.g., firmware), to user devices 108-1, 108-2, . . . 108-N. The OS configurator can promote implementation of the methods, non-transitory CRM, and/or the systems for thinning operating systems, as described herein.

The OS configurator can, for example, monitor, remove, and/or add the number of computing components 110-1, 110-2, 110-3, . . . 110-M loaded on the operating system 109. In various examples, the OS configurator can monitor a number of functionalities of a number of operating systems during runtime. Examples of such functionalities can include World Wide Web ("Web") browsing, electronic mail ("e-mail"), instant messaging ("IM"), office productivity applications, word processing, spreadsheets, and/or playing media (e.g., audio and/or video file)s, among other functionalities. The number of functionalities can be provided by a number of computing components stored thereon (e.g., stored on the OS). Examples of such computing components can include kernels (e.g., kernel modules), OS services, commands, and/or utilities, among other computing components.

That is, the OS configurator can add and/or remove the number of computing components 110-1, 110-2, 110-3, . . . 110-M during runtime. Removing can refer to unloading (e.g., automatically unloading) some or all of at least one of the number of computing components 110-1, 110-2, 110-3, . . . 110-M loaded (e.g., loaded into local memory associated with the OS) on a given OS (e.g., the OS 109) or a given number of OSs. Accordingly, in some examples, removing can include automatically removing at least one of the number of computing components (e.g., undesired computing components) completely from the OS during runtime.

Alternatively or in addition, the OS configurator can activate and/or deactivate the number of computing components 110-1, 110-2, 110-3, . . . 110-M and/or tune parameters associated with the number of computing components loaded on the OS 109. Activation can refer to enabling at least one of the number of computing components 110-1, 110-2, 110-3, . . . 110-M to perform a number of functionalities related thereto. For example, activation can include dedicating an application (e.g., an application having a number of computing components to provide a number of particular functions) to a number of cores of a central processing unit (CPU). That is, in various examples, a number of cores for a number of CPUs can be dedicated to a particular application. Deactivation can refer to disabling at least one of the computing components 110-1, 110-2, 110-3, . . . 110-M to perform a number of functionalities related thereto.

The OS configurator can, in various examples, live in firmware. Such firmware can be a hardware and/or software. In various examples, a firmware supervisor can be provided along with the OS configurator. In some examples, the firmware supervisor can provide run-time services (e.g., one or more of the number of functionalities of a given OS) and/or an abstraction layer for hardware specific services. However, the disclosure is not so limited. That is, such partitioning of work (e.g., partitioning of functions between the firmware supervisor and/or the OS configurator) can be partitioned in a suitable manner to promote thinning of OSs, as described herein. Additionally, while FIG. 1 depicts a single OS (e.g., the OS 109) having four computing components (e.g., 110-1, 110-2, 110-3, and 110-M) loaded on a single user device (e.g., user device 108-1), the number of computing components, number of OSs, and/or the number of user devices, among others, can include various numbers and/or combination of the same in order to promote thinning of OSs.

In various examples, the OS configurator can automatically add an additional computing component to provide an at least one additional functionality to the OS or the number of OSs. Adding can refer to adding and/or activating an additional functionality not loaded and/or activated on, for example, the OS at the time of a request for the functionality. Automatic addition, can for example, occur in response to a request, as described herein, for a functionality not loaded on and/or activated on a given OS (e.g., not currently loaded on the OS). The OS configurator can provide the additional functionality without initiating an interrupt response. As described herein, an interrupt response refers to a panic response (e.g., a response to a software failure inside a particular kernel) and/or other unrecoverable fault responses resulting from a request for application functionality not loaded on and/or activated on the OS.

In some examples, the OS can include a hypervisor that provides an abstract firmware/hardware view for the OS. The hypervisor can allocate firmware and/or the OS to a CPU (e.g., a core of a CPU). That is, the hypervisor can enable oversubscription of a number of cores of a CPU. However, such a hypervisor may create overhead (e.g., a load) on the computing system and/or may result in an I/O stall (e.g., an I/O stall related to context switching in OSs themselves). That is, unlike the methods of the present disclosure, using a hypervisor alone and/or in combination with a mainframe and/or middleware, may result in a manual process and/or does not support avoidance of I/O stall (e.g., an I/O stall from context switching in an OS).

Figure 2:
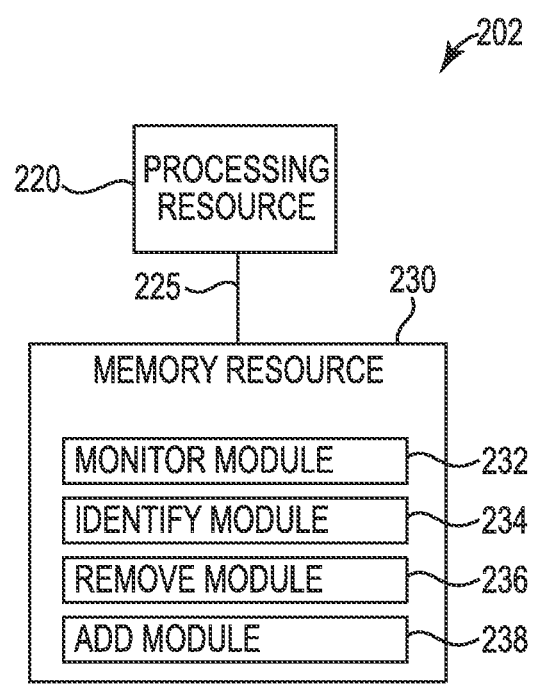
FIG. 2 illustrates a block diagram of an example of a system for thinning operating systems according to the present disclosure.

FIG. 2 illustrates a diagram of an example system 202 for thinning OSs according to the present disclosure. The system 202 can utilize software, hardware, firmware, and/or logic to perform a number of functions. The system 202 can be a combination of hardware and program instructions for thinning OSs. The hardware, for example can include a processing resource 220 and a memory resource 230 (e.g., a non-transitory computer-readable medium (CRM)).

The system 202 can include a number of processing resources (e.g., processing resource 220). The processing resources (e.g., processing resource 220), as described herein, can include a suitable number of processing resources capable of executing instructions stored by a memory resource. Processing resource 220 may be integrated in a single device or distributed across devices. The processing resources (e.g., processing resource 220) can be communicatively coupled to a memory resource (e.g., a non-transitory CRM 230) via a communication path 225.

The communication path 225 can be local or remote to a computing device associated with the processing resource 220. Examples of a local communication path 225 can include an electronic bus internal to a computing device where the memory resource 230 is one of volatile, non-volatile, fixed, and/or removable storage medium in communication with the processing resource 220 via the electronic bus.

The communication path 225 can be such that the memory resource 230 is remote from the processing resource (e.g., 220), such as in a network connection between the memory resource 230 and the processing resource (e.g., 220). That is, the communication path 225 can be a network connection. Examples of such a network connection can include a local area network (LAN), wide area network (WAN), personal area network (PAN), and the Internet, among others. In such examples, the memory resource 230 can be associated with a first computing device and the processing resource 220 can be associated with a second computing device (e.g., a Java® server). For example, a processing resource 220 can be in communication with a memory resource 230, wherein the memory resource 230 includes a set of instructions and wherein the processing resource 220 is designed to carry out the set of instructions.

The processing resource 220 can be in communication with a memory resource 230 storing a set of CRM executable by the processing resource 220, as described herein. The CRM can also be stored in remote memory managed by a server and represent an installation package that can be downloaded, installed, and executed.

Memory resources (e.g., memory resource 230) may be integrated in a single device or distributed across devices. Further, memory resources may be fully or partially integrated in the same device as processing resource 220 or it may be separate but accessible to that device and processing resource 220. The system 202 may be implemented on a user device of the number of user device 108-1, 108-2, and/or 108-N and/or on a collection (e.g., combination) of user devices.

The memory resource 230 can be integral, or communicatively coupled, to a computing device, in a wired and/or a wireless manner. For example, the memory resource 230 can be an internal memory, a portable memory, a portable disk, or a memory associated with another computing resource (e.g., enabling CRM to be transferred and/or executed across a network such as the Internet).

Processing resource 220 can execute CRM that can be stored on an internal or external memory resource 230. The processing resource 220 can execute CRM to perform various functions, including the functions described herein. For instance, the processing resource 220 can execute CRM to promoting thinning of operating systems.

The memory resource (e.g., CRM 230) can include a number of modules 232, 234, 236, 238. The number of modules can include CRM that can be executed, for example, by the processing resources (e.g., processing resource 220) to perform a number of functions, as described herein. The number of modules 232, 234, 236, 238 can be sub-modules of other modules. For example, a monitor module 232 and a identify module 234 can be sub-modules and/or contained within the same computing device. In another example, the number of modules 232, 234, 236, 238 can include individual modules at separate and distinct locations (e.g., computer-readable medium, etc.). In some examples, all or a portion of the modules can be executed automatically by the processing resources (e.g., processing resource 220) to automatically perform the number of functions, as described herein.

A monitor module 232 can, in various examples, include a number of CRM executable by the processing resources (e.g., processing resource 220) to perform or achieve the particular act of a number of monitoring functions. In various examples, the monitor module 232 can monitor a number of functionalities of a number of OSs during runtime, the number of functionalities being provided by a number of computing components stored thereon. Such monitoring can include to determine a number of computing components loaded thereon (e.g., loaded on the OS) and/or an status associated with being activated or deactivated, as described herein, associated with each of the determined computing components. Monitoring can be performed during runtime. Monitoring can be performed continuously (e.g., actively monitoring an OS) or periodically (e.g., following an interrupt response) as determined by an IT administrator and/or in accordance with a service level agreement (SLA). In some examples, the monitor module can monitor a load time and/or unload time associated with addition or removal of the number of computing components, as described herein.

An identify module 234 can include a number of instructions that can be executed by the processing resources (e.g., processing resource 220) to perform or achieve the particular act of performing a number of indentifying functions. In various examples, the identify module 234 can automatically identify an undesired functionality of the number of functionalities during runtime.

A remove module 236 can include a number of instructions that can be executed by the processing resources (e.g., processing resource 220) to perform or achieve a number of removing functions. For example, the remove module can, in various examples, remove (e.g., automatically remove) from the number of OSs at least one of the number of computing components that provides the undesired functionality during runtime as a result of the automatic identification (e.g., automatic identification by the identify module 234) to thin the number of OSs.

In some examples, the remove module 236 can include instructions to partially remove the at least one undesired computing component and/or instructions to retain registry information associated therewith (e.g., on the OS). Such retention of registry information can support addition of the at least one undesired computing component at a later time should a request for a functionality provided by the removed at least one component by requested, as described herein. In some examples, the remove module 236 can include instructions to remove the registry information from the OS if the registry information remains unused for a threshold amount of time.

In some examples, the remove module 236 can include instructions to record and store state information as a recorded state associated with an event. Such recorded state information can be stored in a storage resource (e.g., storage device 104 as illustrated in FIG. 1). In some examples, the recorded state can include a record of the number of computing components loaded on the OS at a time of an event and/or a record of tunable parameters associated therewith. Examples of tunable parameters can include prefetching parameters, memory parameters (e.g., random access memory allocation), semaphore parameters, and/or message parameters, among other parameters.

Examples of an event can include addition or removal of one of the number of computing components and/or the modification of a number of tunable parameters, among other events. Such a recorded state can provide a checkpoint for a particular OS or OSs and/or enable restoration to the OS or OSs to the recorded state. For example, adding and/or removing a number of computing components to be the same or similar to the recorded state. In some examples, the remove module 236 can include instructions to record state information and/or include instructions to restore the state information to a recorded state associated with an event. For instance, such restoration can occur in response to a restore request (e.g., a restore request provided by a user via the user devices).

The remove module 236 can, in some examples, include instructions to predict which computing components of the number computing components are to be loaded and/or removed (e.g., will be removed). Such a prediction can, in some examples, be based upon a priori knowledge (e.g., as contained in a SLA) and/or can be predicted using logic. That is, in some examples, such a prediction can be based on the recorded state information using an optimizing scheme and/or a number of optimization criteria corresponding thereto. Examples of optimizing schemes can include Bayesian optimizing schemes, genetic optimization schemes, annealing optimization schemes, and/or other optimization schemes such as classic optimization schemes (e.g., optimizing with regard to the optimizing criteria). Examples of optimizing criteria refer to a time to solution (e.g., reducing a time to solution for a given optimization scheme), a response time (e.g., reducing response time for an application), latency time (e.g., reducing latency time of the application), memory use (e.g., reducing memory use associated with the application), application availability (e.g., increasing application availability), and/or application performance (e.g., increasing application speed), among others. In some examples, a checkpoint can be stored (e.g., in the storage resource) that can contain information including, for example, a particular optimizing scheme and/or a particular corresponding number of optimization criteria (e.g., settings associated with the optimization criteria). Such a check can, for example, be used to restore the OS to the settings associated with the particular number of optimization criteria and/or the particular optimization scheme.

In various examples, the remove module 236 can be coupled to a storage resource (e.g., a storage resource 104 as illustrated in FIG. 1). The storage resource can receive instructions, for example, to store the undesired functionality in the storage resource in response to removal of the undesired functionality (e.g., removal by the remove module 236). As described herein, a storage resource can be a suitable combination of software, hardware, firmware, and/or logic to promote thinning of OSs. Such a storage resource can be, for example, a non-transitory CRM.

An add module 238 can include a number of instructions that can be executed by the processing resources (e.g., processing resource 220) to perform or achieve a number of adding functions. In various examples, the add module 238 can add (e.g., automatically add) an additional computing component to provide at least one additional functionality to the number of OSs during runtime in response to a request for a functionality not loaded (e.g., not currently loaded) thereon.

A request can be provided (e.g., provided to the add module). Such a request may be provided via the user device (e.g., by a user of a number of user devices 108-1, 108-2, . . . 108-N) and/or automatically, for example, in accordance with a SLA. The request can include a request for a functionality that the number of computing components on the OS can provide and/or cannot provide (e.g., a request for a functionality provided by a computing component not loaded on the OS). For instance, such a request may include a request for a functionality not provided by the OS at the time of the request. In various examples, the add module 238 can include instructions to add an additional computing component that provides the additional functionality without initiating an interrupt response, as described herein. That is, in some examples, the additional computing component that is added can satisfy the request (e.g., a requested functionality of the request).

For instance, in some examples, the add module 238 can include instructions to add the additional computing component by adding at least one of the number computing components stored in a storage resource (the storage resource 104 as illustrated in FIG. 1). That is, in some examples, the add module 238 can include instructions to add a functionality that satisfies the request for a functionality. Satisfying a request refers to providing a number of computing components that can provide a functionality associated with a given request. In some, examples, a computing component(s) of the number of computing components that previously was identified (e.g., identified by the identifying module 234) can be added by the add module 238 in response to a request for a given functionality providing by the previously removed computing component(s). That is, in some examples, the undesired functionality stored in the storage resource can be added by the add module 238 in response to a request (e.g., a new request) for the undesired functionality. The add module 238 can add at least one of the number of computing components without taking an interrupt response, as described herein.

The processing resource 220 can be coupled to the memory resource 230 can execute CRM to perform various functions. CRM can be executed to monitor a number of functionalities of an OS, the number of functionalities being provided by a number of computing components loaded thereon. CRM can be executed to automatically identify an undesired functionality of the number of functionalities during runtime. CRM can be executed to automatically remove from the OS at least one of the number of computing components that provides the undesired functionality during runtime as a result of the automatic identification to thin the OS. CRM can be executed to automatically add an additional computing component to provide an additional functionality to the OS during runtime in response to a request for a functionality not loaded thereon.

Figure 3:
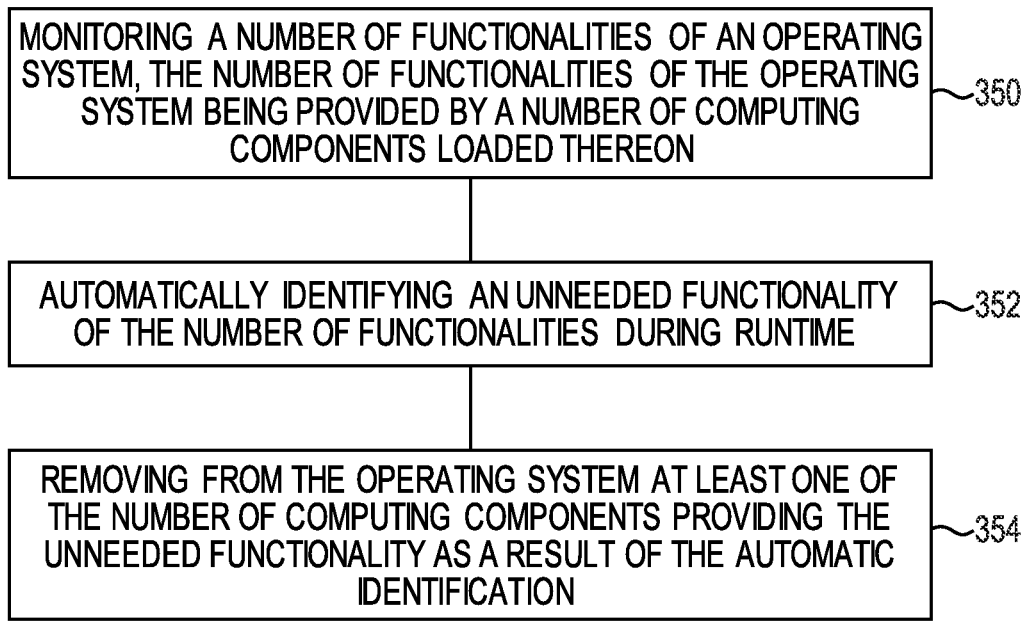
FIG. 3 illustrates a block diagram of an example of a method for thinning operating systems according to the present disclosure.

FIG. 3 illustrates a block diagram of an example of a method for thinning OSs according to the present disclosure. As shown at block 350, in various examples, the method can include monitoring a number of functionalities of an OS, the number of functionalities of the OS can be provided by a number of computing components loaded thereon, as described herein. That is, monitoring can include executing instructions stored in memory to monitor a number of functionalities of an OS, as described herein. In some examples, monitoring (e.g., automatically monitoring) the OS can include automatically determining the number of functionalities provided by the number of computing components loaded on the OS at a given time during runtime and/or determining a previous time of use of each of the number of functionalities. A previous time of use refers to a time associated with execution of a particular function. For example, a start and/or end time of execution of a particular function, among other times associated with the execution of the function and/or a time since execution of a particular function (e.g., an idle time).

Additionally, as shown at 352, in various examples, the method can include automatically identifying an undesired functionality of the number of functionalities during runtime, as described herein. Indentifying can include can include executing instructions stored in memory to automatically identify an undesired functionality of the number of functionalities during runtime. For example, identifying an undesired functionality can, for example, include a functionality not be employed by a given OS and/or infrequently employed by the given OS (e.g., satisfying a threshold amount of time). In some examples, monitoring the OS can include automatically determining the number of functionalities provided by the number of computing components loaded on the OS, for example, at a given time during runtime and/or determining a previous time of use of each of the number of functionalities.

In some examples, automatically identifying the undesired functionality can include automatically indentifying a functionality having a previous time of use meeting a threshold amount of idle time as the undesired functionality.

Moreover, as shown at 354, in various examples, the method can include removing from the OS at least one of the number of computing components providing the undesired functionality as a result of the automatic identification to thin the OS, as described herein. In some examples, the method can include monitoring the OS to automatically determine the number of functionalities provided by the number of computing components loaded on the OS at a given time during runtime. Such a determination can include additional information associated with the number of functionalities, for example, a previous time of use of each of the number of functionalities. Determination of the previous time of use can, in some examples, promote automatic identification of the undesired functionality, as described herein. For example, an undesired functionality can be determined automatically by indentifying a functionality having a previous time of use satisfying a threshold (e.g., a threshold amount of time). For instance, a functionality having a last use (e.g., 6 months prior to a current time) can satisfy a threshold amount of time (e.g., 3 months). In such an example, the functionality having a last use that satisfies the threshold amount of time can be automatically identified and/or removed. In some examples, the method can include automatically removing (e.g., complete removal) of at least one of the number of computing components from the OS during runtime.

The specification examples provide a description of the applications and use of the system, CRM, and method of the present disclosure. Since many examples can be made without departing from the spirit and scope of the system and method of the present disclosure, this specification sets forth some of the many possible example configurations and implementations.

What is claimed:

1. A method, comprising:
recording state information that provides a record of a number of computing components loaded on an operating system (OS) at a time of an event and a record and tunable parameters associated with the number of computing components at the time of the event, wherein the event includes addition or removal of one of the number of computing components or the modification of a number of tunable parameters,
predicting a computing component of the number computing components that is to be removed based on the recorded state information, wherein the predicting uses an optimizing model corresponding to a number of optimization criteria;
partially removing the computing component from the OS as a result of the prediction to thin the OS and retain registry information associated with the computing component; and
removing the registry information from the OS when the registry information remains unused for a threshold amount of time.

2. The method of claim 1, wherein removing includes automatically removing at least one of the number of computing components completely from the OS during runtime.

3. A non-transitory computer readable medium storing a set of computer executable instructions, which if executed by a computer cause the computer to:
record state information that provides a record of a number of computing components loaded on an operating system (OS) at a time of an event and a record and tunable parameters associated with the number of computing components at the time of the event, wherein the event includes addition or removal of one of the number of computing components or the modification of a number of tunable parameters,
predict a computing component of the number computing components that is to be removed based on the recorded state information, wherein the predict uses an optimizing model corresponding to a number of optimization criteria;
partially remove the computing component from the OS during runtime as a result of the prediction to thin the OS and retain registry information associated with the removed computing component, wherein the registry information is removed from the OS when the registry information remains unused for threshold amount of time; and
automatically add an additional computing component to provide an additional functionality to the OS during runtime in response to a request for a functionality not loaded thereon.

4. The non-transitory computer readable medium of claim 3, wherein the instructions to add include instructions to add the additional computing component that provides the additional functionality without initiating an interrupt response.

5. The non-transitory computer readable medium of claim 3,
wherein the recorded state information is stored in a storage resource and includes a record of the number of computing components loaded on the OS at a time of an event and a record of tunable parameters associated therewith.

6. The non-transitory computer readable medium of claim 5, wherein the instructions to record state information include instructions to restore the state information to a recorded state associated with an event.

7. The non-transitory computer readable medium of claim 3, wherein the instructions to predict include instructions to predict the computing component of the number of computing components that is to be removed based on a priori knowledge, where the a priori knowledge includes knowledge contained in a service level agreement.

8. The non-transitory computer readable medium of claim 3, wherein the instructions to predict include instructions to predict the computing component of the number of computing components that is to be removed based on logic.

9. The non-transitory computer readable medium of claim 3, where the number of optimization criteria include a time to solution, where the time to solution refers to a comparatively reduced time to solution.

10. The non-transitory computer readable medium of claim 3, where the number of optimization criteria include a response time, where the response time refers to a comparatively reduced response time for an application.

11. The non-transitory computer readable medium of claim 3, where the number of optimization criteria include a latency time criteria, where the latency time criteria refers to a comparatively reduced latency time of an application.

12. The non-transitory computer readable medium of claim 3, where the number of optimization criteria include a memory use criteria, where the memory use criteria refers to a comparatively reduced memory use associated with an application.

13. The non-transitory computer readable medium of claim 3, where the number of optimization criteria include an application availability criteria, where the application availability criteria refers to a comparatively increased availability of an application.

14. The non-transitory computer readable medium of claim 3, where the number of optimization criteria include an application performance criteria, where the application performance criteria refers to a comparatively increased speed of an application.

15. A system, comprising:
- a processing resource;
- a non-transitory computer readable medium storing computer executable instructions thereon, which if executed by the processing resource cause the system to:
  - record state information that provides a record of a number of computing components loaded on an operating system (OS) at a time of an event and a record and tunable parameters associated with the number of computing components at the time of the event, wherein the event includes addition or removal of one of the number of computing components or the modification of a number of tunable parameters,
  - predict a computing component of the number computing components that is to be removed based on the recorded state information, wherein the predict uses an optimizing model corresponding to a number of optimization criteria;
  - partially remove the computing component from the OS as a result of the prediction to thin the OS and retain registry information associated with the removed computing component, wherein the registry information is removed from the OS when the registry information remains unused for threshold amount of time; and
  - automatically add an additional computing component to provide at least one additional functionality to the OS during runtime in response to a request for a functionality not loaded thereon; and
- a storage resource to receive the instructions including instructions to store the removed computing component in the storage resource.

16. The system of claim 15, wherein the instructions to add the additional computing component include instructions to add at least one of the number computing components stored in the storage resource.

17. The system of claim 15, wherein the instructions to add include instructions to add a functionality that satisfies the request for a functionality.

18. The system of claim 15, wherein the computing components include of at least one of software or firmware stored on the OS.

19. The system of claim 15, wherein the computing components include at least one of kernels, OS services, applications, applets, commands, or utilities stored on the OS.

* * * * *